United States Patent [19]

Kawamura et al.

[11] Patent Number: 5,106,268
[45] Date of Patent: Apr. 21, 1992

[54] OUTLET PRESSURE CONTROL SYSTEM FOR ELECTROMAGNETIC RECIPROCATING PUMP

[75] Inventors: Akira Kawamura, Shizuoka; Toshio Osada, Tokyo, both of Japan

[73] Assignee: Nitto Kohki Co., Ltd., Tokyo, Japan

[21] Appl. No.: 514,664

[22] Filed: Apr. 25, 1990

[30] Foreign Application Priority Data

May 16, 1989 [JP] Japan .............................. 1-55950[U]

[51] Int. Cl.⁵ .............................................. F04B 49/08
[52] U.S. Cl. ........................................ 417/45; 417/418
[58] Field of Search ...................... 417/44, 417, 418, 45

[56] References Cited

U.S. PATENT DOCUMENTS

| | | | |
|---|---|---|---|
| 3,542,495 | 11/1970 | Barthalon | 417/416 |
| 3,966,358 | 6/1976 | Heimes et al. | 417/45 |
| 4,506,517 | 3/1985 | Pandzik | 417/298 |
| 4,575,313 | 3/1986 | Rao et al. | 417/44 |
| 4,692,673 | 9/1987 | DeLong | 417/417 |
| 4,706,470 | 11/1987 | Akazawa et al. | 417/417 |
| 4,787,823 | 11/1988 | Hultman | 417/45 |
| 4,884,954 | 12/1989 | Van Niekerk | 417/417 |
| 4,927,334 | 5/1990 | Engdahl et al. | 417/418 |

FOREIGN PATENT DOCUMENTS

| | | | |
|---|---|---|---|
| 0060403 | 5/1977 | Japan | 417/417 |
| 0032173 | 2/1988 | Japan | 417/417 |

Primary Examiner—Richard A. Bertsch
Assistant Examiner—David W. Scheuermann
Attorney, Agent, or Firm—Kinney & Lange

[57] ABSTRACT

An electromagnetic reciprocating pump which maintains the outlet pressure at a preset value comprising a pressure sensor for detecting the actual outlet pressure of the electromagnetic reciprocating pump and means to feedback control the frequency of the reciprocating motion and, if necessary, its stroke of the electromagnetic drive means based on the deviation from the preset outlet pressure of the actual outlet pressure. The reciprocating motion frequency control of the electromagnetic drive means may be done by modulating the frequency and amplitude of the half-wave AC current supplied to the electromagnetic drive means. With this, the control of the number of times of the reciprocating motion of the electromagnetic drive means can be carried out without changing the reciprocating motion stroke of the electromagnetic drive means.

5 Claims, 2 Drawing Sheets

OUTLET PRESSURE CONTROL SYSTEM FOR ELECTROMAGNETIC RECIPROCATING PUMP

BACKGROUND OF THE INVENTION

1. Field of the Invention

The present invention relates to a pressure control system for an electromagnetic reciprocating pump, and particularly to a pressure control system for an electromagnetic reciprocating pump which can maintain the actual outlet pressure at a predetermined value.

2. Description of the Prior Art

Various proposals have so far been made to the structure of a compressor equipment. But, it is general to convert a rotating drive source to the linear reciprocating motion of a compressor piston through a crank mechanism, or to generate a pressurized fluid by connecting a rotating drive source to a rotation-type fluid compressing device. The former is accompanied by a large noise and vibration, and the overall structure becomes complex. The latter is excellent in noise and vibration, but the sealing is very difficult in the rotation-type fluid compressing device.

Also, outlet pressure control for these compressor equipments is typically on-off control, and it is difficult to perform an accurate pressure control with high precision.

In contrast to this, in an electromagnetic reciprocating pump using an electromagnetic drive means as the drive source, since the electromagnetic drive means itself performs a linear motion, a mechanism for converting a rotary motion to a linear motion or an advanced sealing technique such as needed in the rotation-type fluid compressing device is not required, so it has advantages such as simplification of the structure of the whole equipment and a smooth fluid compressing motion.

In addition, different from the compressor equipments of other types as described above, it is extremely easy to vary the piston stroke in the electromagnetic reciprocating pump. That is, the piston stroke of the electromagnetic reciprocating pump directly connected to the electromagnetic drive means can be varied with a relation of 1:1 by controlling the amplitude and/or frequency of the AC current to be supplied to the excitation winding of the electromagnetic drive means to vary its motion stroke. This is another advantage of the electromagnetic reciprocating pump.

Electromagnetic drive means suitable for the electromagnetic reciprocating pump is described in Maurice Barthalon's U.S. Pat. No. 3,542,495, for instance.

As described above, the electromagnetic reciprocating pump has many advantages as compared with other type compressor equipments, but no proposal was made in the past to the pressure control of its discharge fluid.

SUMMARY OF THE INVENTION

It is an object of the present invention to provide a pressure control system for an electromagnetic reciprocating pump which maintains the outlet pressure at a present value.

The characteristic feature of the present invention resides in that a pressure sensor for detecting the actual outlet pressure of the electromagnetic reciprocating pump, and the frequency of the reciprocating motion and, if necessary, its stroke of the electromagnetic drive means are feedback controlled by using the deviation from the preset outlet pressure of the actual outlet pressure detected by the pressure sensor. According to the control of the reciprocating motion frequency and/or stroke of the electromagnetic drive means, the number of times of the reciprocating motion and/or the stroke of the compressor piston connected to the electromagnetic drive means vary, whereby the outlet pressure of the electromagnetic reciprocating pump is controlled.

Also, the characteristic feature resides in that the reciprocating motion frequency control of the electromagnetic drive means is done by modulating the frequency and amplitude of the half-wave AC current supplied to the electromagnetic drive means. With this, the control of the number of times of the reciprocating motion of the electromagnetic drive means can be carried out without changing the reciprocating motion stroke of the electromagnetic drive means and with a relatively simple construction.

DETAILED DESCRIPTION OF THE PREFERRED EMBODIMENT

Figure 1:
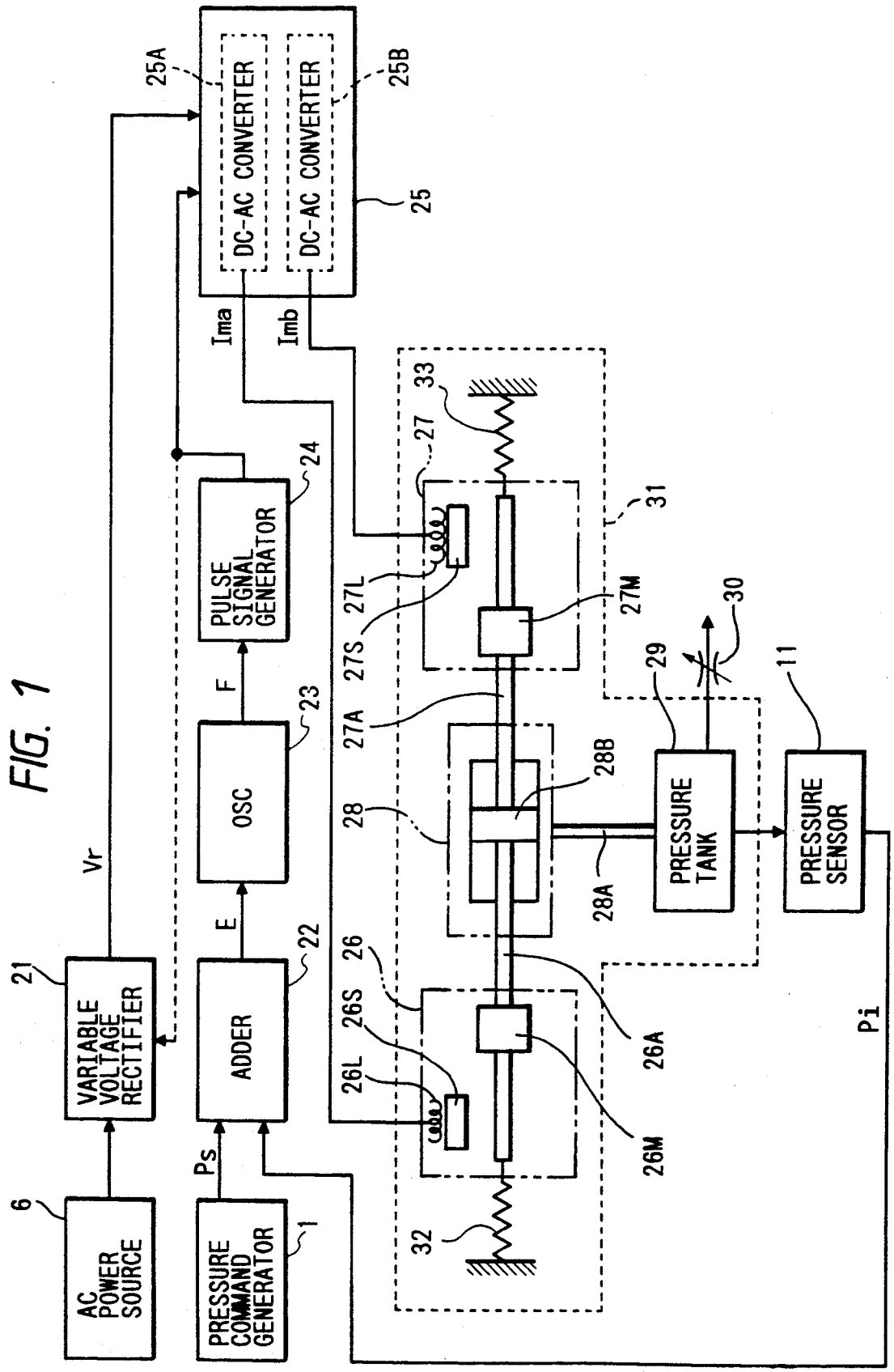
FIG. 1 is a block diagram of an embodiment of the present invention.

The present invention is described in detail with reference to FIG. 1, which shows a block diagram of an embodiment of the present invention.

In the same figure, a pressure demand generator 1 specifies the pressure of the fluid to be discharged from an electromagnetic reciprocating pump 31. An adder 22 adds a pressure command signal Ps output from the pressure command generator 1 and a fluid pressure signal Pi output from a pressure sensor 11, which is to be described later on, thereby operating the error signal (deviation) E. A frequency oscillator 23 receives the error signal E output from the adder 22 and generates a signal of frequency F which is a function of the error signal E. A pulse signal generator 24 generates a pulse signal in response to the output frequency signal F of the frequency oscillator 23.

The pulse signal from the pulse signal generator 24 is input to a variable voltage rectifier 21, and a DC voltage Vr in a proportional relationship with the pulse signal or frequency signal is generated from the variable voltage rectifier 21.

A power converter 25 consists of two sets of DC-AC converters 25A and 25B which are comprised of thyristors and power transistors, etc., and each of them is supplied with the DC voltage Vr from the variable voltage rectifier 21. Also, the pulse signal is input to the gate of each DC-AC converter 25A, 25B (not shown) from the pulse signal generator 24, whereby the DC-AC converters 25A and 25B are controlled for firing. Whereupon, AC half-wave voltages of an amplitude depending on the output Vr of the variable voltage rectifier 21 and of a frequency depending on the output F of the frequency oscillator 23 are output alternately from the DC-AC converters 25A and 25B.

These half-wave AC voltages are supplied to the excitation windings 26L and 27L which are wound around the stator cores 26S and 27S of a first electromagnetic drive means 26 and a second electromagnetic drive means 27, respectively. In these excitation windings, excitation currents Ima and Imb flow alternately depending on the frequency and amplitude of the output voltage of the power converter 25. This allows magnetic fluxes Φa and Φb to be alternately induced in the stator cores 26S and 27S of the first and the second electromagnetic drive means 26 and 27, depending on the magnitude of the excitation currents Ima and Imb, respectively, attracting moving cores 26M and 27M. The first and second electromagnetic drive means 26 and 27 may be the same as described in the specification of the above-mentioned U.S. Pat., for instance. Of course, it is possible to omit one of the DC-AC converters 25A and 25B, supply one half-wave of the AC output of one DC-AC converter to the first electromagnetic drive means, and supply the other half-wave of the reverse phase to the second electromagnetic drive means.

To the moving cores 26M and 27M of the first and the second electromagnetic drive means 26 and 27, the piston 28B of a compressor 28 is attached via piston rods 26A and 27A, respectively. Since the moving cores 26M and 27M are alternately attracted in the directions reverse to each other, the piston 28B reciprocates.

Figure 2:
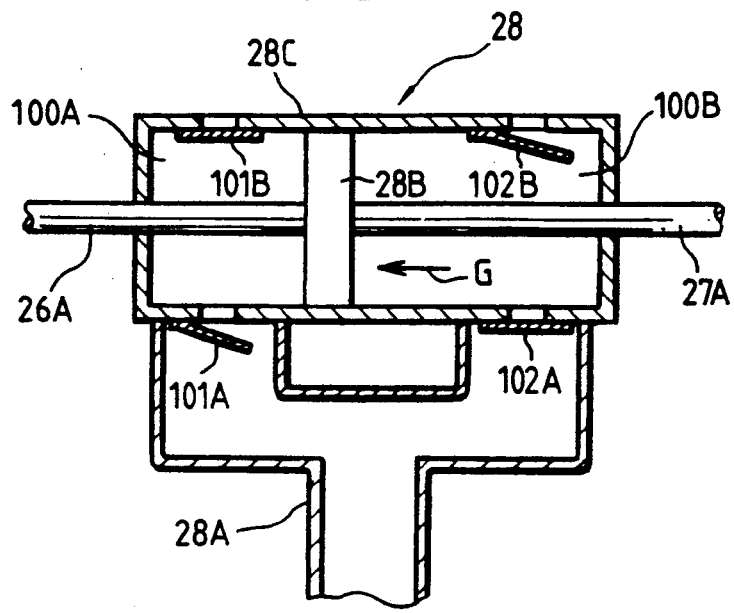
FIG. 2 is a longitudinal section showing the schematic structure of the compressor shown in FIG. 1.

FIG. 2 is a longitudinal section showing the profile of the compressor 28 where the same symbols as FIG. 1 represent the same or identical portions.

In FIG. 2, the piston 28B is slidably disposed in a compressor body 28C. Connected to the piston 28B are the piston rods 26A and 27A, which are connected to the movable portions of the first and the second electromagnetic drive means 26 and 27 (FIG. 1).

The compressor body 28C is divided by the piston 28B into two fluid chambers 100A and 100B, which are provided with an outlet valve 101A and an inlet valve 101B as well as an outlet valve 102A and an inlet valve 102B, respectively. For instance, when the piston 28B is driven in the direction of an arrow G by the motion of the first electromagnetic drive means 26, the fluid in the fluid chamber 100A is discharged into a fluid passage 28A through the outlet valve 101A, and a supplemental fluid is introduced into the fluid chamber 100B through the inlet valve 102B. When the piston 28B is moved in the direction reverse to that of the arrow G by the motion of the second electromagnetic drive means 27, the fluid introduced into the fluid chamber 100B is discharged into the fluid passage 28A through the outlet valve 102A, and another supplemental fluid is introduced into the fluid chamber 100A through the inlet valve 101B. The fluid discharged into the fluid passage 28A is introduced into a pressure tank 29.

The alternate traveling of the moving cores of the first and second electromagnetic drive means 26 and 27, as described above, causes the pistons 28B of the compressor 28 to reciprocate within the compressor body 28C.

As previously stated, when the first DC-AC converter 25A is driven by the firing pulse output from the pulse signal generator 24, the excitation current Ima flows in the first electromagnetic drive means 26, and the movable portion of the first electromagnetic drive means 26 causes the piston 28B of the compressor 28 to travel toward the first electromagnetic drive means 26 (in the direction of the arrow G in FIG. 2). The piston 28B stops at a point where the repulsive force of a return spring 32 of the movable portion of the first electromagnetic drive means 26 balances with the sum of the electromagnetic force Fma of the first electromagnetic drive means 26 and the restoring force of a return spring 33 of the movable portion of the second electromagnetic drive means 27, whereby the fluid is discharged from the fluid chamber 100A of the compressor 28 and the supplemental fluid is sucked into the fluid chamber 100B.

When the second DC-AC converter 25B is driven by the subsequent firing pulse, the operation of the first DC-AC converter 25A stops, the excitation current Ima of the first electromagnetic drive means 26 becomes 0, and simultaneously the excitation current Imb begins to flow in the excitation winding 27L of the second electromagnetic drive means 27. Whereupon, the movable portion of the second electromagnetic drive means 27 causes the piston 28B of the compressor 28 to travel toward the second electromagnetic drive means 27 (in the direction reverse to the arrow G in FIG. 2). The piston 28B stops at a point where the repulsive force of the return spring 33 balances with the sum of the electromagnetic force mb of the second electromagnetic drive means 27 and the restoring force of the return spring 32, whereby the fluid is discharged from the fluid chamber 100B of the compressor 28 and the supplemental fluid is sucked into the fluid chamber 100A.

By repetition of the above described operation, the fluid is fed under pressure to the pressure tank 29 via the fluid passage 28A. The fluid under a predetermined pressure which is stored in the pressure tank 29 is taken out to the exterior through a discharge quantity regulator means 30.

The pressure sensor 11 is provided in the pressure tank 29. The pressure sensor 11 detects the fluid pressure in the pressure tank 29 and outputs an electric signal (fluid pressure signal Pi) proportional to the pressure of the fluid. The fluid pressure signal Pi is sent to the adder 22, where it is added to the pressure command signal Ps issued by the pressure demand generator 1 and the sum signal is output as the error (deviation) signal E. In this embodiment, it is predetermined that the pressure command signal Ps assumes a positive value and the fluid pressure signal Pi a negative value.

Figure 3:
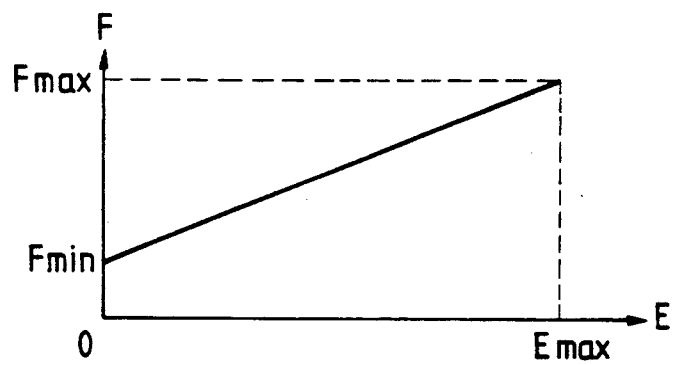
FIG. 3 is a graph showing the relationship between the error signal which is output from the adder and the oscillation frequency of the frequency oscillator.

FIG. 3 is a graph showing the relationship between the error signal E output from the adder 22 and the oscillation frequency F of the frequency oscillator 23. In the same figure, assuming that the maximum error signal which the electrogmagnetic reciprocating pump 31 may produce is Emax (Emax>0), and the oscillation frequencies when the error signal is Emax or 0 is Fmax or Fmin (Fmax>Fmin>0), then the oscillation frequency F is expressed by the following equation (1) when the error signal is E.

$$F = Fmin + E\{(Fmax - Fmin)/Emax\} \tag{1}$$

Figure 4:
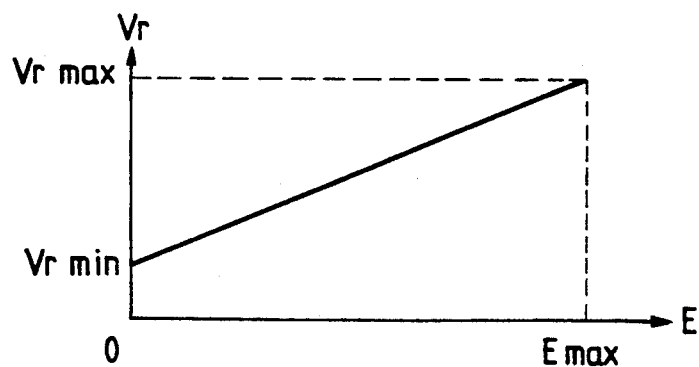
FIG. 4 is a graph showing the realtionship between the error signal which is output from the adder and the DC voltage which is output from the variable voltage rectifier.

FIG. 4 is a graph showing the relationship between the error signal E output from the added 22 and the DC voltage Vr output from the variable voltage rectifier 21. In the same figrue, if the DC voltages when the error signal is Emax or 0 is assumed to be Vrmax or Vrmin (Vrmax>Vrmin>0), the DC voltage Vr is expressed by the following equation (2) when the error signal is E.

$$Vr = Vrmin + E(Vrmax - Vrmin)/Emax \tag{2}$$

At least one of the Fmin and Vrmin is set at the upper limit value of the dead band where the first and second electromagnetic drive means 26 and 27 do not operate. And the one of the Fmin and Vrmin which is not set at the upper limit value is set to a value beyond the dead band.

Therefore, if the error signal E is larger than 0, that is, if the actual outlet pressure is lower than the determined outlet pressure, the frequency and amplitude of the AC voltage supplied to the first and the second electromagnetic drive means 26 and 27 vary depending on the error signal E, whereby the number of reciprocating motions of the piston 28B of the compressor 28 varies and the quantity of the fluid fed under pressure from the compressor 28 to the pressure tank 29 changes. This is, the quantity of the fluid fed under pressure from the compressor 28 to the pressure tank 29 is feedback controlled according to the fluid pressure signal Pi output from the pressure sensor 11, and as a result, the actual outlet pressure of the electromagnetic reciprocating pump 31 is automatically controlled so as to match the preset outlet pressure.

If the error signal is zero or a negative value, at least one of the oscillation frequency F and the output voltage Vr would not be larger than the upper limit value Fmin or Vrmin of the bed dead bands, so that the first and the second electromagnetic drive means 26 and 27 would not be operated.

For instance, if the frequency of the AC voltage is increased, inductance of the excitation windings of the first and the second electromagnetic drive means 26 and 27 also increase and the excitation currents decrease, so that the reciplocating strokes of the movable portions of the first and the second electromagnetic drive means 26 and 27 tend to become smaller. Since the amplitude of the output voltage of the DC-AC converter 25 is also varied along with change in the frequency of the output voltage in this embodiment, however, the currents flowing in the excitation windings can be kept constant even if inductance of the excitation windings varies. As a result, the reciprocation stroke of the movable cores of the first and the second electromagentic drive means 26 and 27, namely of the piston 28B, can always be maintained constant. In addition, the voltage control can also be made so that the excitation winding currents also increase as the frequency increases and conversely, so that the excitation currents also decrease as the frequency decreases. This enables the same effect to be obtained as that obtained when the gain of the control loop is made larger.

As shown in FIG. 1 by dotted lines, the control of the DC voltage Vr by the error signal E may be omitted. In this case, by only control of the frequency of the AC voltages supplied to the first and the second electromagnetic drive means 26 and 27, the actual outlet pressure of the electromagnetic reciprocating pump 31 can be made to match the preset outlet pressure.

If the travel distance of the movable portions of the first and the second electromagentic drive means 26 and 27 is assumed to be x, the travel distance or the stroke of the piston 28B of the compressor 28 is also x, so, if the sectional area of the piston 28B is S, the entrapment volume U of the fluid is S.x. In this embodiment, as shown in FIG. 2, when the piston 28B moves in the direction of the arrow G, the fluid is discharged from the fluid chamber 100A, and when it moves in the reverse direction, the fluid discharge is performed from the fluid chamber 100B, so that the fluid two times of the entrapment volume U can be compressively discharged during one cycle.

It is natural that the present invention can be applied not only to an electromagnetic reciprocating pump having a compressor driven by two electromagnetic drive means as shown in FIGS. 1 and 2, but also can be applied to an electromagnetic reciprocating pump having a compressor driven by single electromagnetic drive means.

Further, although it has been described that the oscilation frequency F and the variable output voltage Vr vary according to the error signal E as shown in FIGS. 3 and 4, the frequency F and the voltage Vr may be set at fixed values exceeding the dead band only if E is positive, and they may be set within the dead band if E is 0 or negative.

As apparent from the above description, the following technical advantages are accomplished by the present invention.

(1) By feedback controlling the reciprocating motion frequency of the electromagnetic drive means on the basis of the error signal which is a function of the actual outlet pressure and preset outlet pressure of an electromagnetic reciprocating pump so that the error signal nears 0, thereby to regulate the number of times of the reciprocation of the compressor connected to the electromagnetic drive means, the actual outlet pressure of the electromagnetic reciprocating pump is always maintained at the preset outlet pressure.

(2) By performing the oscillation frequency control of the electromagnetic drive means through modulation of the frequency and amplitude of the half-wave AC current supplied to the electromagnetic drive means, the oscillation frequency control of the electromagnetic drive means can be performed accurately with a relatively simple arrangement without effecting the reciprocation stroke of the drive means.

(3) By only control of the frequency of the AC voltages supplied to the first and the second electromagnetic drive means, the actual outlet pressure of the electromagnetic reciproccating pump 31 can be made to match the preset outlet pressure.

What is claimed is:

1. An outlet pressure control system for an electromagnetic reciprocating pump comprised of a electromagnetic drive means and a compressor driven by the electromagnetic drive means comprising
a pressure command generator for setting an outlet pressure, a pressure sensor for sensing the actual outlet pressure of the compressor, and control means responsive to an error signal which is a function of the output signals of the pressure command generator and the pressure sensor, for controlling the reciprocation frequency of the electromagnetic drive means so that the error signal nears zero.

2. An outlet pressure control system for an electromagnetic reciprocating pump of claim 1 wherein the electromagnetic drive means includes a stator core, an excitation winding for magnetically exciting the stator core, and a moving core mechanically connected to a piston of the compressor, and the control means controls the frequency of the AC current supplied to the excitation winding.

3. An outlet pressure control system for an electromagnetic reciprocating pump of claim 1 wherein the electromagnetic drive means includes a stator core, an excitation winding for magnetically exciting the stator core, and a moving core mechanically connected to a piston of the compressor, and the control means controls the frequency and amplitude of the AC current supplied to the excitation winding.

4. An outlet pressure control system for an electromagnetic reciprocating pump of claim 3 wherein the AC current amplitude is controlled so that the magnitude of the AC current supplied to the excitation winding is maintained at a predetermined constant value even if the frequency thereof is varied.

5. An outlet pressure control system for an electromagnetic reciprocating pump of claim 3 wherein the amplitude of the AC current is controlled so that the magnitude of the AC current supplied to the excitation winding increases as the frequency thereof is varied to increase, and the magnitude of the AC current supplied to the excitation winding decreases as the frequency is varied to decrease.

* * * * *